United States Patent
Zhu et al.

(10) Patent No.: US 10,303,327 B2
(45) Date of Patent: May 28, 2019

(54) INFORMATION DISPLAY METHOD AND DEVICE

(71) Applicant: Xiaomi Inc., Beijing (CN)

(72) Inventors: Ruixian Zhu, Beijing (CN); Guangjian Wang, Beijing (CN); Long Pan, Beijing (CN)

(73) Assignee: XIAOMI INC., Beijing (CN)

( * ) Notice: Subject to any disclaimer, the term of this patent is extended or adjusted under 35 U.S.C. 154(b) by 346 days.

(21) Appl. No.: 15/099,265

(22) Filed: Apr. 14, 2016

(65) Prior Publication Data

US 2017/0038918 A1    Feb. 9, 2017

(30) Foreign Application Priority Data

Aug. 3, 2015 (CN) .......................... 2015 1 0469034

(51) Int. Cl.
*G06F 3/0484* (2013.01)
*G06F 3/0482* (2013.01)
*G06F 3/0488* (2013.01)
*G06F 3/0485* (2013.01)

(52) U.S. Cl.
CPC .......... *G06F 3/0482* (2013.01); *G06F 3/0485* (2013.01); *G06F 3/0488* (2013.01); *G06F 3/04842* (2013.01)

(58) Field of Classification Search
CPC .......................... G06F 3/0482; G06F 3/04842
See application file for complete search history.

(56) References Cited

U.S. PATENT DOCUMENTS

| | | | |
|---|---|---|---|
| 7,617,458 B1 | 11/2009 | Wassom, Jr. et al. | |
| 8,042,063 B1 * | 10/2011 | Lin-Hendel | G06F 3/0482 |
| | | | 715/838 |
| 8,234,381 B1 | 7/2012 | Seisuke | |
| 9,009,345 B1 | 4/2015 | Carbone et al. | |
| 9,367,227 B1 * | 6/2016 | Kim | G06F 3/04883 |
| 9,665,348 B1 * | 5/2017 | Black | G06F 9/54 |
| 2003/0160832 A1 * | 8/2003 | Ridgley | G06F 17/30994 |
| | | | 715/854 |

(Continued)

FOREIGN PATENT DOCUMENTS

| CN | 103019606 A | 4/2013 |
|---|---|---|
| CN | 103389858 A | 11/2013 |

(Continued)

OTHER PUBLICATIONS

"Ask LibreOffice", 2012-2013, retrieved on Nov. 6, 2018 from https://ask.libreoffice.org/en/question/2026/is-there-a-way-to-go-back-to-the-last-slide-visited-in-impress (Year: 2013).*

(Continued)

*Primary Examiner* — Shourjo Dasgupta
(74) *Attorney, Agent, or Firm* — Brinks Gilson & Lione

(57) ABSTRACT

Information display methods and devices are disclosed. Because display screen of a device may not show a large information list, users may need to browse the information using browsing operations. The screen display a segment of the information list upon each browsing operation. In one embodiment, the identification information of each displayed information segment is recorded and the user may back navigate to a previously displayed information segment based on the recorded identification information.

9 Claims, 14 Drawing Sheets

(56) References Cited

U.S. PATENT DOCUMENTS

| | | | |
|---|---|---|---|
| 2004/0205511 A1* | 10/2004 | Best | G06F 17/30884 715/202 |
| 2006/0053364 A1* | 3/2006 | Hollander | G06F 17/241 715/232 |
| 2007/0280229 A1 | 12/2007 | Kenney | |
| 2009/0094520 A1 | 4/2009 | Kulas | |
| 2009/0119578 A1* | 5/2009 | Relyea | G06F 9/451 715/234 |
| 2010/0005053 A1 | 1/2010 | Estes | |
| 2010/0017756 A1 | 1/2010 | Wassom, Jr. et al. | |
| 2010/0067064 A1* | 3/2010 | Shigehisa | H04N 1/40062 358/403 |
| 2010/0223542 A1* | 9/2010 | Vuong | G06F 17/241 715/206 |
| 2010/0229100 A1 | 9/2010 | Miller et al. | |
| 2010/0281384 A1* | 11/2010 | Lyons | G06F 3/048 715/723 |
| 2011/0016396 A1* | 1/2011 | Maruyama | G11B 27/105 715/716 |
| 2011/0066982 A1* | 3/2011 | Paulsami | G06F 3/0482 715/835 |
| 2011/0296344 A1* | 12/2011 | Habib | G06F 1/1616 715/810 |
| 2012/0240075 A1* | 9/2012 | Kim | G06F 3/0481 715/776 |
| 2012/0245745 A1* | 9/2012 | Vandevelde | H02S 50/00 700/286 |
| 2013/0044137 A1* | 2/2013 | Forsblom | G09B 29/106 345/661 |
| 2013/0205203 A1* | 8/2013 | MacDougall | G06F 17/24 715/256 |
| 2013/0268832 A1* | 10/2013 | Vemireddy | G06F 17/30884 715/206 |
| 2015/0095817 A1 | 4/2015 | Mamadgi et al. | |
| 2015/0193549 A1* | 7/2015 | Frye | G06F 17/30876 715/739 |
| 2015/0195339 A1 | 7/2015 | Carbone et al. | |
| 2015/0220520 A1* | 8/2015 | Hartmann | G06F 17/30011 707/742 |
| 2015/0227495 A1* | 8/2015 | Hannani | G06F 17/241 715/206 |
| 2015/0242061 A1* | 8/2015 | Patel | G06F 3/017 715/765 |
| 2016/0202860 A1* | 7/2016 | Wang | G06F 3/0483 715/776 |
| 2016/0299566 A1* | 10/2016 | Breedvelt-Schouten | G06F 3/013 |

FOREIGN PATENT DOCUMENTS

| | | |
|---|---|---|
| CN | 103838727 A | 6/2014 |
| CN | 103914523 A | 7/2014 |
| CN | 104199603 A | 12/2014 |
| CN | 104516676 A | 4/2015 |
| CN | 104615348 A | 5/2015 |
| CN | 104793846 A | 7/2015 |
| CN | 104808889 A | 7/2015 |
| CN | 105159524 A | 12/2015 |
| EP | 2 434 368 A1 | 3/2012 |
| JP | 2010225145 A | 10/2010 |
| RU | 2439653 C2 | 1/2012 |
| RU | 2517381 C2 | 5/2014 |
| WO | WO 99/34306 | 7/1999 |
| WO | WO 2010/101917 A1 | 9/2010 |
| WO | WO 2012068520 A2 | 5/2012 |
| WO | WO 2014/106739 A1 | 7/2014 |

OTHER PUBLICATIONS

"Dynamic PowerPoint", 2005, retrieved on Nov. 6, 2018 from http://www.pptmagic.com/articles/dynamicppt.htm (Year: 2005).*

English Translation of International Search Report dated Apr. 27, 2016 for International Application No. PCT/CN2015/097687, 3 pages.

Office Action dated Nov. 13, 2017 for Chinese Application No. 201510469034.X, 5 pages.

Office Action dated Oct. 31, 2017 for Japanese Application No. 2016-526343, 6 pages.

Extended European Search Report dated Dec. 1, 2016 for European Application No. 16162410.1, 9 pages.

International Search Report and Written Opinion dated Apr. 27, 2016 for International Application No. PCT/CN2015/097687, 10 pages.

Decision to Grant a Patent of Japanese Application No. 2016-526343 with English Abstract, dated Apr. 24, 2018.

Decision on Granting a Patent for Invention of Russian Application No. 2016121345 with English Abstract, dated Jun. 19, 2018.

Office Action dated Sep. 13, 2018 for Chinese Application No. 201510469034.X, 7 pages.

* cited by examiner

INFORMATION DISPLAY METHOD AND DEVICE

CROSS-REFERENCE TO RELATED APPLICATIONS

The present disclosure claims priority to Chinese Patent Application with the application number of 201510469034.X, filed on Aug. 3, 2015, the entire contents of which are incorporated herein by reference.

TECHNICAL FIELD

The present disclosure generally relates to the field of network communication, and more particularly, to an interface for information display.

BACKGROUND

With continuous development of network communication technologies, a user may need to browse a massive list of information on a terminal having a display screen that is insufficient to show the entire information list. The user may browse an information list using browsing operations such as scrolling and clicking. While browsing the information list, the user may desire to return to a segment of information in a previously accessed location in the list. Manually navigating the information list page on the terminal to return to a previously visited segment is inefficient and offers poor user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, an electronic information display method is provided, comprising: displaying information segments of an information list one segment at a time according to browsing operations by a user wherein each of the browsing operations corresponds to one displayed information segment and wherein an information segment is a section of information within the information list that fits a display screen; recording identification information of the displayed information segments within the information list in an order based on a time order of the user browsing operation; and jumping to a previously displayed information segment according to the recorded identification information when a jump instruction is received from the user.

In another embodiment, an information display device is provided comprising: a memory configured to store instructions therein; one or more processor, when executing the instruction, configured to: display information segments of an information list one segment at a time according to browsing operations by a user wherein each of the browsing operations corresponds to one displayed information segment and wherein an information segment is a section of information within the information list that fits a display screen; record identification information of the displayed information segments within the information list in an order based on a time order of the user browsing operation; and jump to a previously displayed information segment according to the recorded identification information when a jump instruction is received from the user.

In yet another embodiment, a non-transitory computer-readable storage medium is provided, the storage medium have stored therein instructions that, when executed by a processor of a terminal, causes the terminal to: display information segments of an information list one segment at a time according to browsing operations by a user wherein each of the browsing operations corresponds to one displayed information segment and wherein an information segment is a section of information within the information list that fits a display screen; record identification information of the displayed information segments within the information list in an order based on a time order of the user browsing operation; and jump to a previously displayed information segment according to the recorded identification information when a jump instruction is received from the user.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
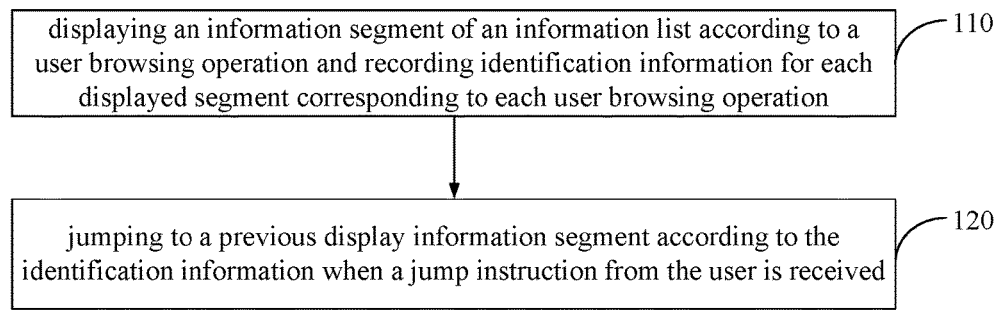
FIG. 1 is a flow chart of an information display method.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The methods, devices, and modules described herein may be implemented in many different ways and as hardware, software or in different combinations of hardware and software. For example, all or parts of the implementations may be a processing circuitry that includes an instruction processor, such as a central processing unit (CPU), microcontroller, a microprocessor; or application specific integrated circuits (ASICs), digital signal processors (DSPs), digital signal processing devices (DSPDs), programmable logic devices (PLDs), field programmable gate arrays (FPGAs), controllers, micro-controllers, microprocessors, other electronic components; or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Subject matter will now be described in more detail hereinafter with reference to the accompanying drawings in which the same numbers in different drawings represent the same or similar elements unless otherwise represented. The drawings form a part hereof, and show, by way of illustration, specific exemplary embodiments. Subject matter may, however, be embodied in a variety of different forms and, therefore, covered or claimed subject matter is intended to be construed as not being limited to any exemplary embodiments set forth herein. A reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

It should be understood that various information may be described with terms first, second, third and the like in the present disclosure, but these information should not be limited to these terms. These terms are only adopted to distinguish information of the same type. For example, without departing from the scope of the present disclosure, first information may also be called second information. Similarly, second information may also be called first information. Depending on the context, the word "if" used here may be explained as "while" or "when" or "responding to."

FIG. 1 is a flow chart of an information display method on a user interface, according to an exemplary embodiment of the present disclosure. The method may be implemented in a terminal, wherein the terminal may be but is not limited to a smart phone, a tablet, a personal computer, and the like.

In step 110, a list of information is displayed in a user interface and browsed from segment to segment according to user browsing operations, and identification information for each browsed segment after each user browsing operation is recorded. The term segment and term section is used interchangeably in this disclosure to refer to a part of the information within the information list that fits into the display screen.

Specifically, a terminal may provide massive browsable information lists to a user. These lists may include but are not limited to, contact lists, short messages or news items. An information list is massive in that its content may not be presentable in one screen shot on a user display. In addition, there may be embedded links within the information list. A user may need to perform some browsing operations to navigate to different segments of the information list or redirect to information destination specified by the embedded links. These browsing operations will be also referred to as user operations herein. Examples of a browsing operation include but are not limited to scrolling or swiping, and clicking, by mouse or by finger on a touch screen. When the user browses or navigates through the information list, after every browsing operation, the terminal may display a segment of the information list on its display screen. It is advantageous to record the identification information for each segment displayed after each user operation, so as to facilitate returning the user to segments which has already been browsed upon user request.

For example, when the user browses an information list via the terminal, the terminal may records a location of a displayed segment within the information list each time the user performs a browsing operation on the information list. When the user desires to jump to a previously browsed segment, the terminal may be able to rapidly and automatically relocate and display the previously browsed segment based on the recorded identification information, such as the location information of the previously browsed segments within the information list.

In step 120, when a jump instruction from the user is detected, the terminal redirect the display to show a previously browsed section according to the segment identification information recorded after each user operation.

In the embodiment above, the terminal may store segment identification information in a data stack. When the jump instruction is received, the terminal may extract the segment identification information, e.g., an location of the segment within the information list, of previously browsed and displayed segments from the data stack and jump to the previous displayed segment according to the segment location. User jump instructions may be provided by various means. For example, a back button may be provided. When user clicks the button, the terminal detects a jump instruction for returning to the previously browsed section. By click the button multiple times, the user may step through multiple previously browsed segments. Alternatively, the user may be provided a box for typing in a number and a back button. In this exemplary embodiment, the user may specify a number and click the back button. Upon receiving this jump instruction, the terminal may return to the segment of the information list the user browsed 5 browsing operations ago.

Thus, in the embodiment of FIG. 1, the terminal displays the information list according to user operations, records the identification information of each segment displayed after each user operation, and jumps to the previous display sections according to the recorded identification information when a jump instruction is received from the user. In such a way, the terminal may rapidly and automatically jump to a previously display sections as requested by the user, providing improved user convenience and user experience.

Figure 2:
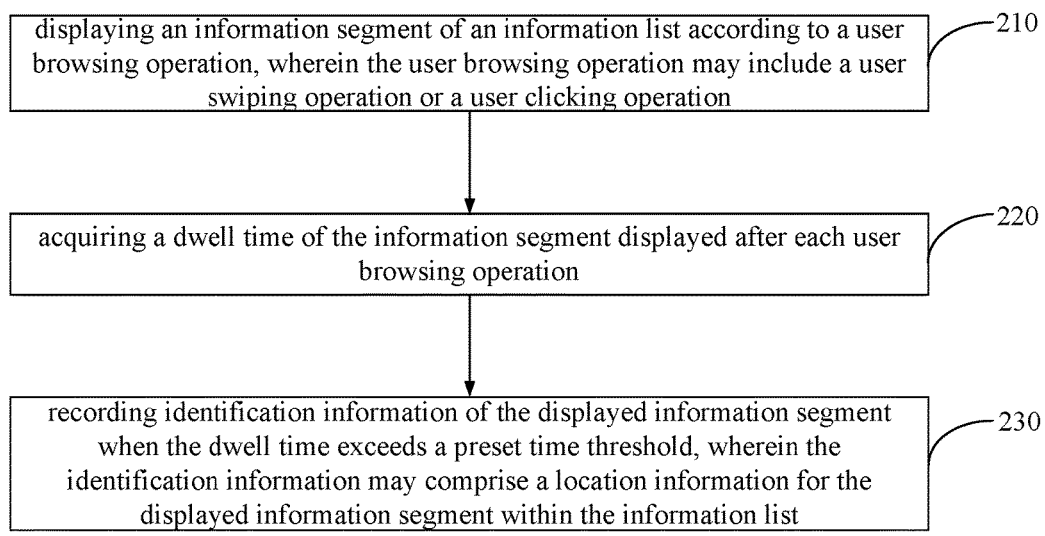
FIG. 2 is a flow chart of another information display method.

FIG. 2 is a flow chart of an embodiment for displaying information segments and recording identification information for browsed segments of step 110 in FIG. 1. In step 210, the terminal display a segment of the information list according to a user operation detected by the terminal, wherein the user operation may include a user swiping operation or a user clicking operation, as described previously. For example, when the user browses a contact list via the terminal, the user may browse to different sections of the contact list by scrolling or swiping operations. In another example, when the user browses a news list via the terminal, the user may redirect to detailed information of a news item by clicking operations on embedded links in the news list.

In step 220, the terminal acquires and records a dwell time of the segment displayed after each user operation. Specifically, a dwell time may be monitored when the terminal displays a segment corresponding to a user operation. A longer dwell time may be an indication that the user is interested in the content of the segment whereas a short dwell time may indicate that the user is not as interested in the content of the segment. Then the terminal may record the dwell time, use it as an indicator of user interest, and determine whether to record the identification information of the corresponding segment based on the length of the dwell time.

In step 230, the terminal records the identification information of the segment when the dwell time exceeds a preset time threshold. Again, the identification information for the segment may comprise a location of the segment within the information list. The preset time threshold is a threshold set by the terminal according to a practical context, and is configured to measure a degree of interest of the user. A dwell time for a segment longer than the preset time threshold may indicate that the user is interested in the content of the segment and thus the identification information for the segment and the associated browsing operation may be worth recording. On the other hand, a dwell time of the segment shorter than the preset time threshold may indicate that the user is not interested in the content of the segment and thus the identification information for the segment and the associated browsing operation may not be worth recording.

Thus, according to the embodiment of FIG. 2, the terminal acquires and records the dwell time of each segment displayed upon user operations, and records the segment identification information of the displayed segment when the dwell time of the segment exceeds the preset time threshold. In such a way, the terminal may only need to record segment identification information of a displayed segment of interest to the user. Storage resources of the terminal can be saved, and display efficiency is also improved by not recording identification information for segments that are of no interest to the user. For example, a sure may perform a continuous scrolling operations and rapidly browsing the information list. The user may stop the scrolling and examine a particular section of the information list when she sees items of interest. The dwell time for that particular segment on the display may be longer than the preset threshold and the identification of this segment is recorded by the terminal for the user to return at a later time.

Figure 3:
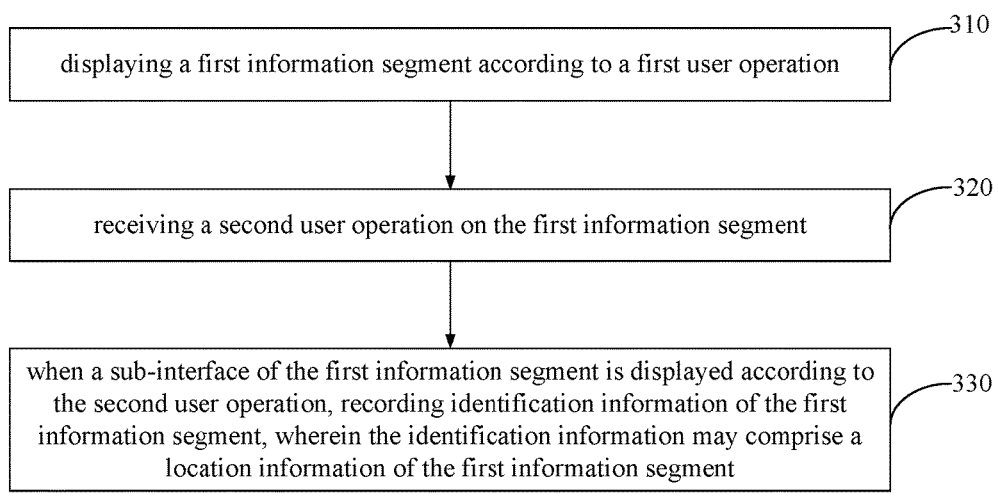
FIG. 3 is a flow chart of another information display method.

FIG. 3 is a flow chart of another embodiment for displaying information segments and recording identification information for browsed segments of step 110 of the information display method of FIG. 1. In step 310, the terminal displays a first information segment in response to a first user operation. The first user operation may be, for example, a user scrolling or swiping operation or a user clicking operation.

In step 320, the terminal receives a second user operation of the user operated on the first information segment. Specifically, when the user desires to browse and examine details of a certain item of information, the user may click the item at the position where the item is located, so that the terminal may display a sub-interface of the segment to present the details of the information item to the user. The sub-interface may be a redirected display interface showing information outside the information list. It may be based on the information segment but with expanded information about the clicked information item.

In step 330, when a sub-interface of the first interface is displayed according to the second user operation, the terminal records identification information of the first information segment, wherein the identification information comprises a location of the first segment within the information list. Specifically, when the user performs browsing operation to direct the terminal to display the sub-interface of the first segment, she indicates her interest in the first information segment of the information list. The identification information of the first segment is thus recorded for subsequent rapid return by the user.

Thus, according to the embodiment of FIG. 3, the terminal displays the first information segment of the information list according to the first user operation, receives the second user operation of the user on the first segment, and records the identification information of the first segment when the sub-interface of the first segment is displayed in response to the second user operation. In this way, the terminal may record the identification information of the information segment in which the user is interested, providing improved user experiences.

Figure 4:
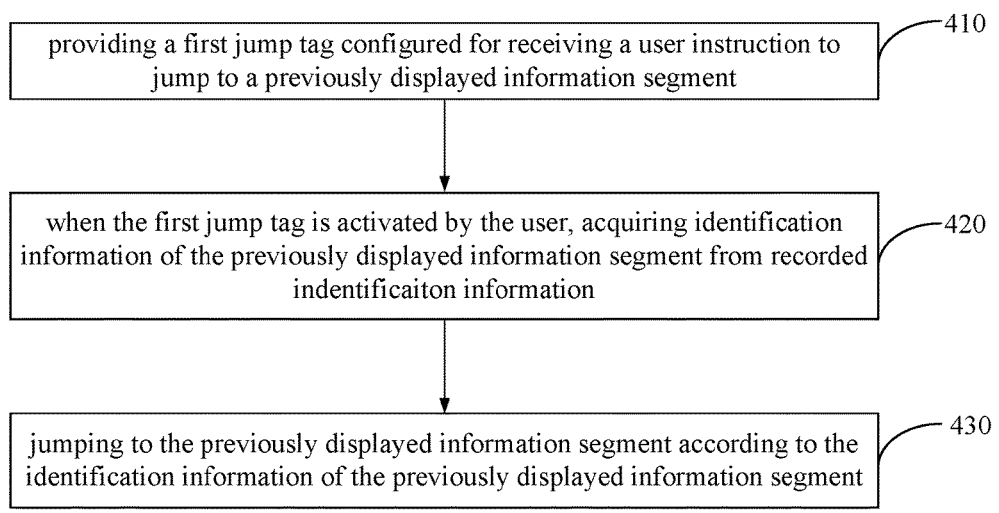
FIG. 4 is a flow chart of another information display method.

FIG. 4 is a flow chart of a further embodiment of the information display method of FIG. 1. Besides the steps of FIG. 1, the embodiment of the method in FIG. 4 may further include the following steps. In step 410, the terminal sets a first jump tag configured for receiving user instruction to jump to the previously displayed segment of the information list immediately prior to the currently displayed segment. A jump tag may be a button. The first jump tag may be an existing tag embedded with a jump function, and it may alternatively be an additional tag specially configured for receiving user jump instructions. The jump tag for the latter implementation may resemble a conventional back navigation button.

In step 420, when a jump instruction of the user associated with the user activation of the first jump tag is received, the terminal acquires the identification information of the segment displayed and recorded immediately prior to the currently displayed segment from the recorded identification information. In this embodiment, the terminal may store the identification information recorded for browsed segments in a data stack. When the jump instruction of the user for the first jump tag is detected, the terminal only need to extract the identification information of the previous display information segment immediately prior to the currently displayed segment from the data stack (e.g., the most recent entry in the data stack) and jump to that previous displayed segment according to the identification information. The identification information recorded in the data stack may include stacked identification information of a plurality of previously display information segments.

In step 430, the terminal display jumps to the previously displayed segment (the most recently displayed and recorded segment prior to the current segment) according to the identification information of the previously displayed segment. Thus, according to the embodiment of FIG. 4, the terminal may provide the first jump tag for the user to input a jump instruction and rapidly jump to the previously displayed segment (the most recently displayed and recorded segment prior to the current segment) in response to the jump instruction from the user, providing improved navigational and display efficiency.

Figure 5:
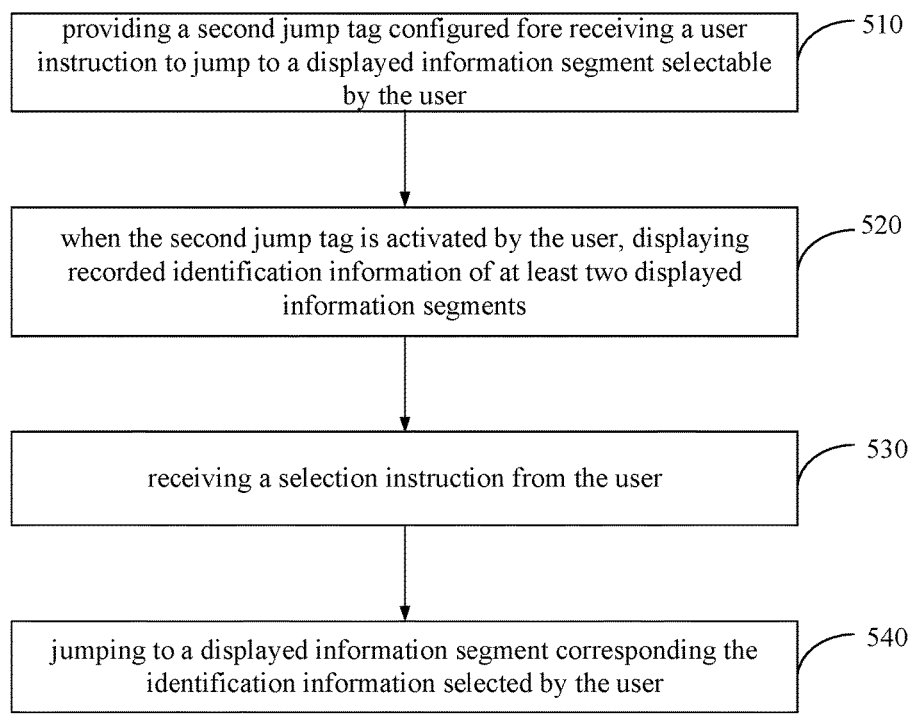
FIG. 5 is a flow chart of another information display method.

FIG. 5 is a flow chart of another further embodiment of information display method of FIG. 1. Besides the steps of FIG. 1, the embodiment of the method in FIG. 5 may further include the following steps. In step S10, the terminal sets a second jump tag configured to allow the user to select which of the plurality of previously displayed segments to display. The second jump tag may be an existing tag embedded with a jump function, and may alternatively be an additional tag specially configured for jumping to one of the previous segments selected by the user.

In step S20, when a jump instruction of the user associated with an user activation of the second jump tag is received, the terminal displays the recorded segment identification information of at least two previously displayed information segments. The terminal may store the identification information for browsed segments in a data stack. When the jump instruction of the user for the second jump tag is received, the terminal may present the identification information stored in the data stack for all or a set of previously browsed segments and allow the user to select which segment to display.

In step S30, the terminal receives a selection instruction from the user as to which previously browsed segment is desired to be redisplayed. The user may select to jump to any display interface according to the identification information shown for the plurality of previously browsed segments.

In step S40, the terminal jumps to a selected segment and display it based on the identification information selected by the user.

Thus, according to the embodiment of FIG. 5, the terminal may provide the second jump tag and allow for rapid jump to one of the previously browsed information segments selected by the user according to the jump instructions of the user (by first activate the second jump tag, and then make a selection), providing improved user experiences.

Figure 6:
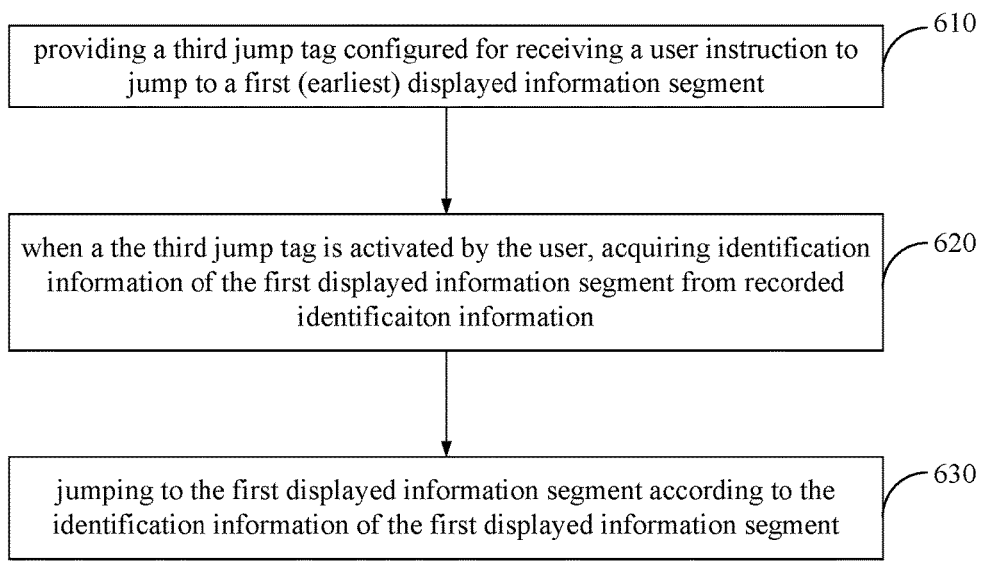
FIG. 6 is a flow chart of another interface display method.

FIG. 6 is a flow chart of another further embodiment of the information display method of FIG. 1. Besides the steps of FIG. 1, the embodiment of the method in FIG. 6 may further include the following steps. In step 610, the terminal provides a third jump tag configured to let the user jump to the first displayed segment (or the home segment, or the earliest browsed segment). The third jump tag may be an existing tag embedded with a jump function, and may alternatively be an additional tag specially configured for allowing the user to jump to the first displayed information segment.

In step 620, when a jump instruction from the user via the user activation of the third jump tag is detected, the terminal acquires the identification information for the first display segment from the recorded identification information. In this embodiment, the terminal may store the identification information for previously browsed segments in a data stack. When the jump instruction of the user via the third jump tag is detected, the terminal extracts the identification information of the first display segment from the data stack.

In step 630, the terminal jumps to the first (earliest) previously displayed segment according to the identification information of the first displayed segment in the data stack. Thus, according to the embodiment of FIG. 6, the terminal may provide the third jump tag and allow for rapid jump to the first browsed segment according to the jump instruction of the user via the third jump tag, providing improved user experiences.

Figure 7:
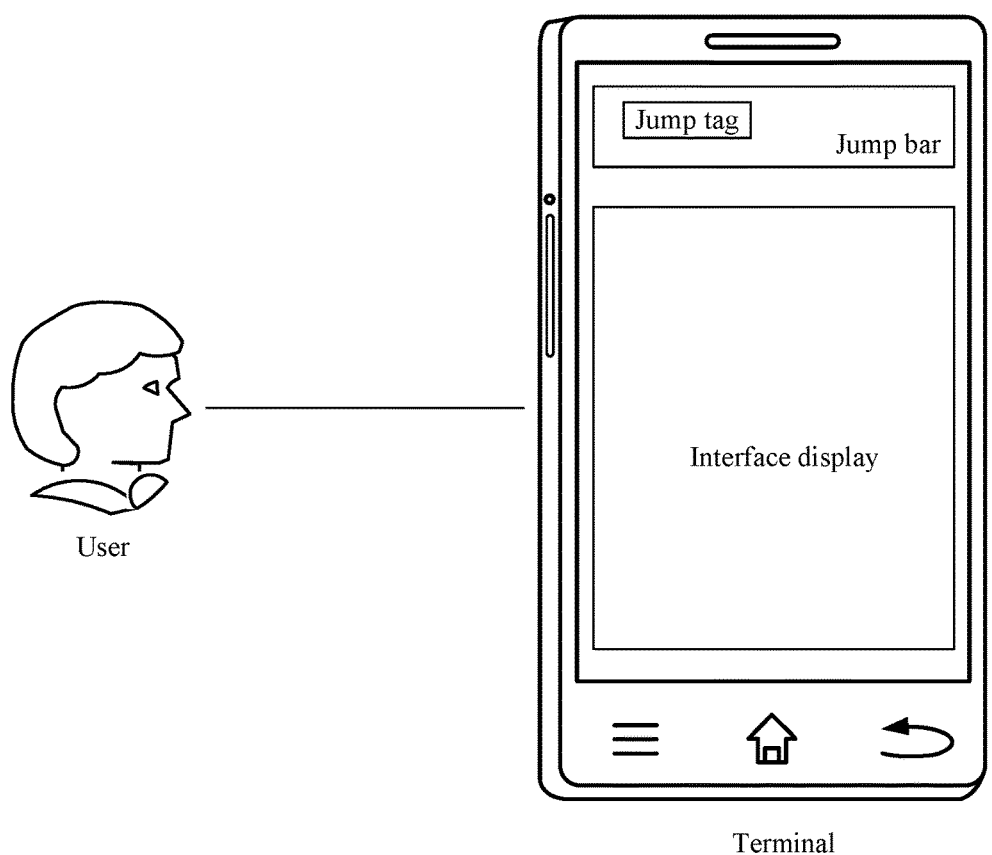
FIG. 7 illustrates an application scenario of an information display method.

FIG. 7 is a diagram showing an application of an information display method, according to an exemplary embodiment above. The application involves a user and a terminal. The terminal displays information segments of an information list according to user browsing operations, and records identification information for browsed segments after each user operation. When a jump instruction from the user is detected, the terminal jumps to a previous browsed information segment according to the recorded identification information for browsed segments. The recorded identification information may be stored in a data stack. The identification information in the data stack may, for example, comply with a First-In/Last-Out rule.

The terminal may provide a first jump tag, as illustrated in FIG. 7. The first jump tag is configured to allow the user to jump to the most recently browsed segment prior to the currently displayed segment when the first jump tag is activated by the user (e.g., clicked by the user). When the first tag is activated by the user, the terminal acquires the identification information of the most recently browsed segment prior to the currently displayed segment from the recorded identification information in the data stack and jumps to display that segment.

For example, the identification information in the data stack, such as location data of each previously browsed segment of the information list, includes [20px, 50px, 60px], wherein 20 ps is the first in entry and 60px is the last in entry (the location of the latest previously browsed segment). If the user clicks the first jump tag once, the terminal reads location data 60px from [20px, 50px, 60px] and jumps to display the segment having a location of 60px in the information list. Following this user operation, the remaining entries in the data stack include [20px, 50px]. If the user clicks the first jump tag again, the terminal reads location data 50px from [20px, 50px] and jumps to the previously browsed segment with location of 50px in the information list. After this user operation, the remaining location data in the data stack includes [20px]. Here, px is a unit for location, e.g., pixel in the scrolling direction.

The terminal may also provide a second jump tag, the second jump tag being configured to allow the user to jump to a display interface selected by the user when the second jump tag is activated. Specifically, when the second jump tag is activated by the user, the terminal displays the recorded identification information for at least two previously browsed segment. The terminal receives a selection instruction from the user among identification information of the plurality of previously browsed segment and jumps to the selected previously browsed segment.

For example, the identification information in the data stack, such as the location data of each previously browsed segment, may include [20px, 50px, 60px], wherein 20 ps is the first in entry and 60px is the last in entry (the location of the latest previously browsed segment). If the user clicks the second jump tag once, or double-clicks the second jump tag once, the terminal reads the three location data [20px, 50px, 60px] from the data stack for the user to select. If the user selects the location data 50px, the terminal jumps to the previously browsed segment identified by location 50px in the information list.

The terminal may also provide a third jump tag, the third jump tag being configured to allow the user to jump to a first (earliest) browsed segment when the third jump tag is activated by the user. Specifically, when the third jump tag is activated by the user, the terminal acquires identification information of the first previously browsed information segment from the recorded identification information, and jump to the first previously browsed segment.

For example, the identification information in the data stack, such as the location data of each previously browsed segment in the information list, may include [20px, 50px, 60px], wherein 20 ps is the first in entry and 60px is the last in entry (the location of the latest previously browsed segment). If the user clicks the third jump tag once, or double-clicks the third jump tag once, the terminal reads location data 20px from the data stack, and jumps to the previously browsed segment identified by location 20px in the information list.

Figure 8:
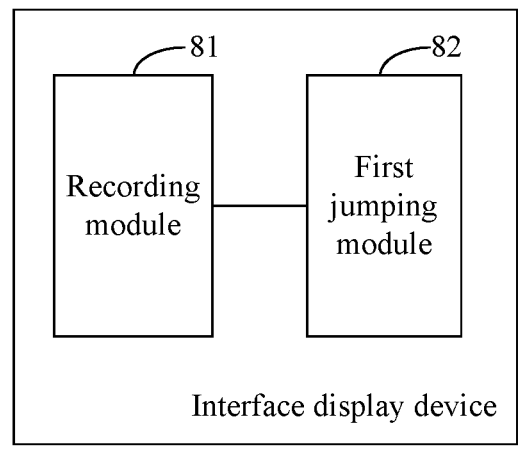
FIG. 8 is a block diagram of an information display device.

Corresponding to the information display method above, the present disclosure further provides various embodiments of an information display device. FIG. 8 is a block diagram for an information display device, according to an exemplary embodiment of the present disclosure. The device may be implemented as a terminal, and may be configured to carry out the information display method of FIG. 1. The device may include a recording module 81 and a first jumping module 82.

The recording module 81 is configured to display an information segment according to a user browsing operation, and to record identification information for each browsed segment of the information list for each user operation. The first jumping module 82 is configured to jump to a previously displayed segment according to the identification information when a jump instruction from the user is received.

According to this embodiment, the device may display information segments of an information list according to user browsing operations, record the identification information of each browsed segment after each user operation, and jump to a previously browsed information segment according to the recorded identification information when a jump instruction from the user is detected. As such, the terminal may allow rapid jump to previously browsed segments upon user instruction, providing improved user experience.

Figure 9:
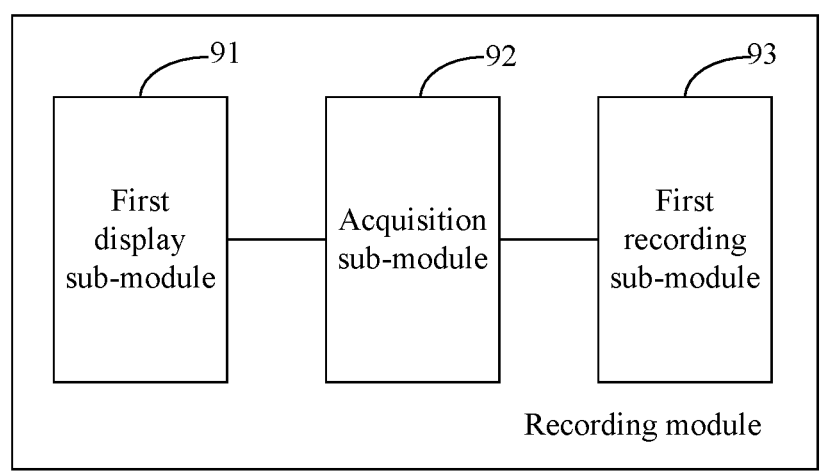
FIG. 9 is a block diagram of another information display device.

FIG. 9 is a block diagram of an embodiment of the recording module 81 of FIG. 8. The recording module 81 may include a first display sub-module 91, an acquisition sub-module 92, and a first recording sub-module 93. The first display sub-module 91 is configured to display an information segment according to the user operation, wherein a user operation may include but is not limited to a user scrolling or swiping operation or a user clicking operation by mouse or figure on a touch screen of the terminal. The acquisition sub-module 92 is configured to acquire a dwell time of each segment browsed after teach user operation. The first recording sub-module 93 is configured to record the identification information of the browsed segments when the dwell time exceeds a preset time threshold. The identification information for a browsed segment may comprise, for example, the location of the segment within the information list. Thus, according to the embodiment of FIG. 9, the device may acquire the dwell time of each browsed information segment following a user operation, and record the identification information of the browsed segments whose dwell time exceeds the preset time threshold. In such a way, the terminal only needs to record identification information of browsed segments of interest to the user. Thus, storage resources of the terminal can be preserved, and information browsing efficiency is further improved.

Figure 10:
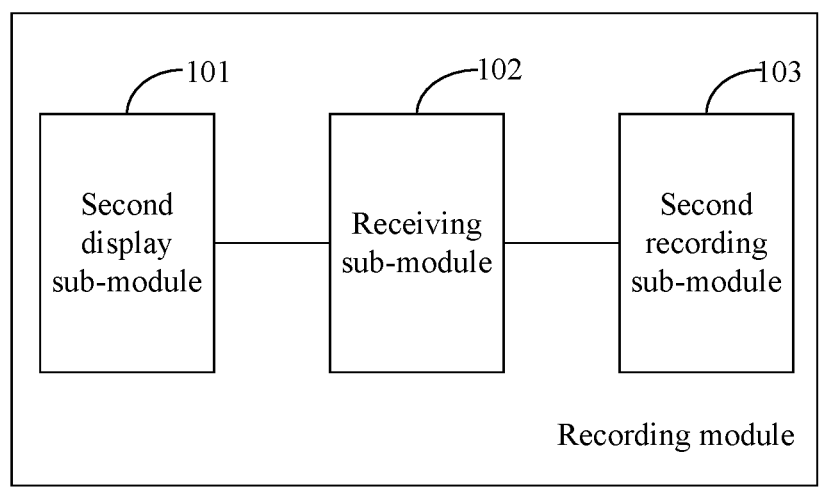
FIG. 10 is a block diagram of another information display device.

FIG. 10 is a block diagram of another embodiment of the recording module 81 of FIG. 8. The recording module 81 may include a second display sub-module 101, a receiving sub-module 102, and a second recording sub-module 103. The second display sub-module 101 is configured to display a first information segment according to a first user operation. The receiving sub-module 102 is configured to receive a second user operation on the first information segment when browsing it. The second recording sub-module 103 is configured to, when a sub-interface of the first information segment is displayed according to the second user operation, record identification information of the first information segment, wherein the identification information comprises a location information of the first segment within the information list. Thus, according to the embodiment of FIG. 10, the device may store the identification information of previously browsed information segments of the information list in a data stack, and extract the identification information of a previously browsed segment from the data stack and jump to the desired segment when a jump instruction from the user is received.

Figure 11:
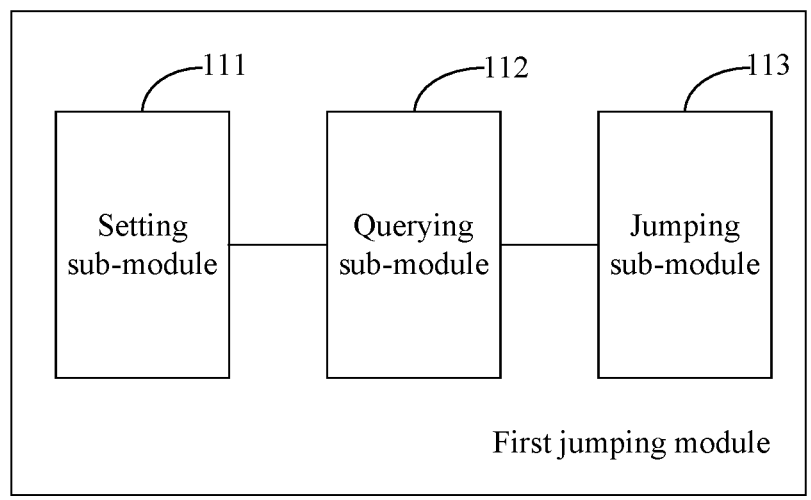
FIG. 11 is a block diagram of another information display device.

FIG. 11 is a block diagram of an embodiment for the first jumping module 82 of FIG. 8. The first jumping module 82 may include a setting sub-module 111, a querying sub-module 112, and a jumping sub-module 113. The setting sub-module 111 is configured to provide a first jump tag configured to allow for jumping to the most recently browsed information segment prior to the currently displayed segment when the first jump tag is activated by the user. The querying sub-module 112 is configured to, when a jump instruction of the user is detected as a result of user activation of the first jump tag, acquire identification information of the most recently browsed information segment prior to the currently displayed segment from the recorded identification information. The jumping sub-module 113 is configured to jump to the most recently browsed information segment prior to the currently displayed segment according to its identification information. Thus, according to the embodiment of FIG. 11, the device may provide the first jump tag and enable rapid jump to the most recently browsed information segment prior to the currently displayed segment upon the jump instruction from the user by activating the first jump tag, providing improved user experience.

Figure 12:
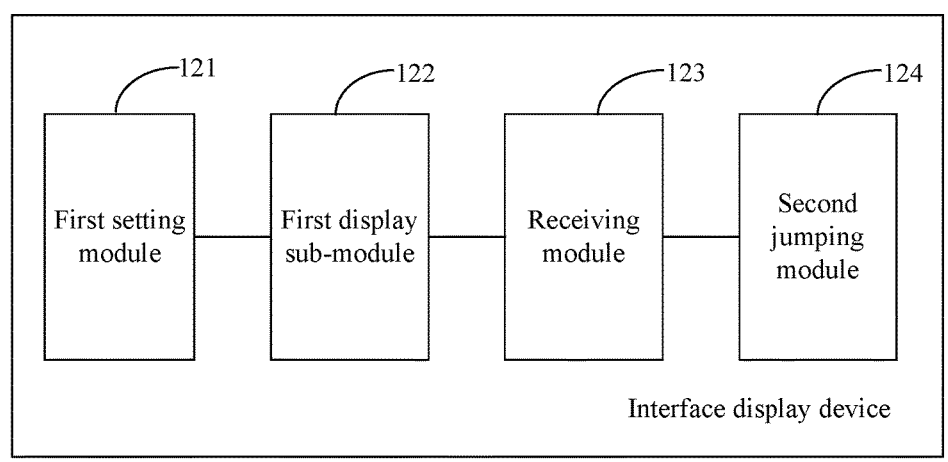
FIG. 12 is a block diagram of another information display device.

FIG. 12 is a block diagram of a further embodiment of the device of FIG. 8. The device of FIG. 8 may further include a first setting module 121, a first display sub-module 122, a receiving module 123 and a second jumping module 124. The first setting module 121 is configured to provide a second jump tag, the second jump tag being configured to allow jumping to a previously browsed segment selected by the user. The first display sub-module 122 is configured to, when a jump instruction from the user is detected as a result of an activation of the second jump tag by the user, display the recorded identification information of at least two previously browsed information segments. The receiving module 123 is configured to receive a selection instruction from the user as to which previously browsed information segment is desired to be displayed again by the user. The second jumping module 124 is configured to jump to the previously browsed information segment selected by the user. Thus, according to the embodiment of FIG. 12, the device may provide the second jump tag and allow for rapid jump to a previously browsed information segment of the information list selected by the user, providing improved user experience.

Figure 13:
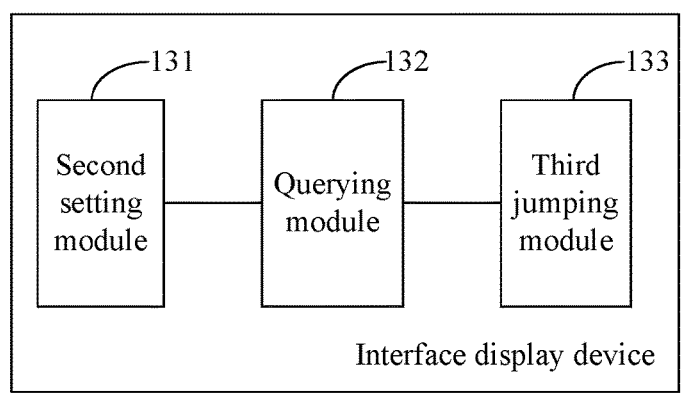
FIG. 13 is a block diagram of another information display device.

FIG. 13 is a block diagram of a further embodiment of the device of FIG. 8. The device of FIG. 8 may further include a second setting module 131, a querying module 132 and a third jumping module 133. The second setting module 131 is configured to provide a third jump tag configured to jump to the first (earliest) browsed information segment of the information list. The querying module 132 is configured to, when a jump instruction from the user is detected as a result of activation of the third jump tag by the user, acquire the identification information of the first (earliest) previously browsed information segment from the recorded identification information. The third jumping module 133 is configured to jump to the first previously browsed information segment according to the identification information of the first previously browsed information segment. Thus, according to the embodiment of FIG. 13, the device may provide the third jump tag and enable rapid jump to the first previously browsed information segment upon receiving the jump instruction from the user as a result of an activation of the third jump tag, providing improved user experience.

The present disclosure further provides another embodiment of the information display device of FIG. 7, comprising a memory configured to store executable instructions and one or more processors, when executing the instructions, are configure to display an information segment of an information list according to a user browsing operation, record identification information of browsed information segments after each user operation, and jump to a previously browsed information segment according to the identification information when a jump instruction from the user is received.

Functions of each module in the device discussed above correspond to the steps of the method embodiments of FIGS. 1 to 6. Since the device embodiments substantially correspond to the method embodiments, description about the various of steps of the method embodiments applies to the corresponding parts of the device embodiments. The device embodiments described above are only schematic, wherein the modules described as separate parts may be or may not be physically separated, and the parts shown as modules may be or may not be physical modules. In other words, the parts may be located at the same place, or may also be distributed on multiple network locations. A subset or all of the modules may be selected to fulfill the aim of solving a practical problem.

Figure 14:
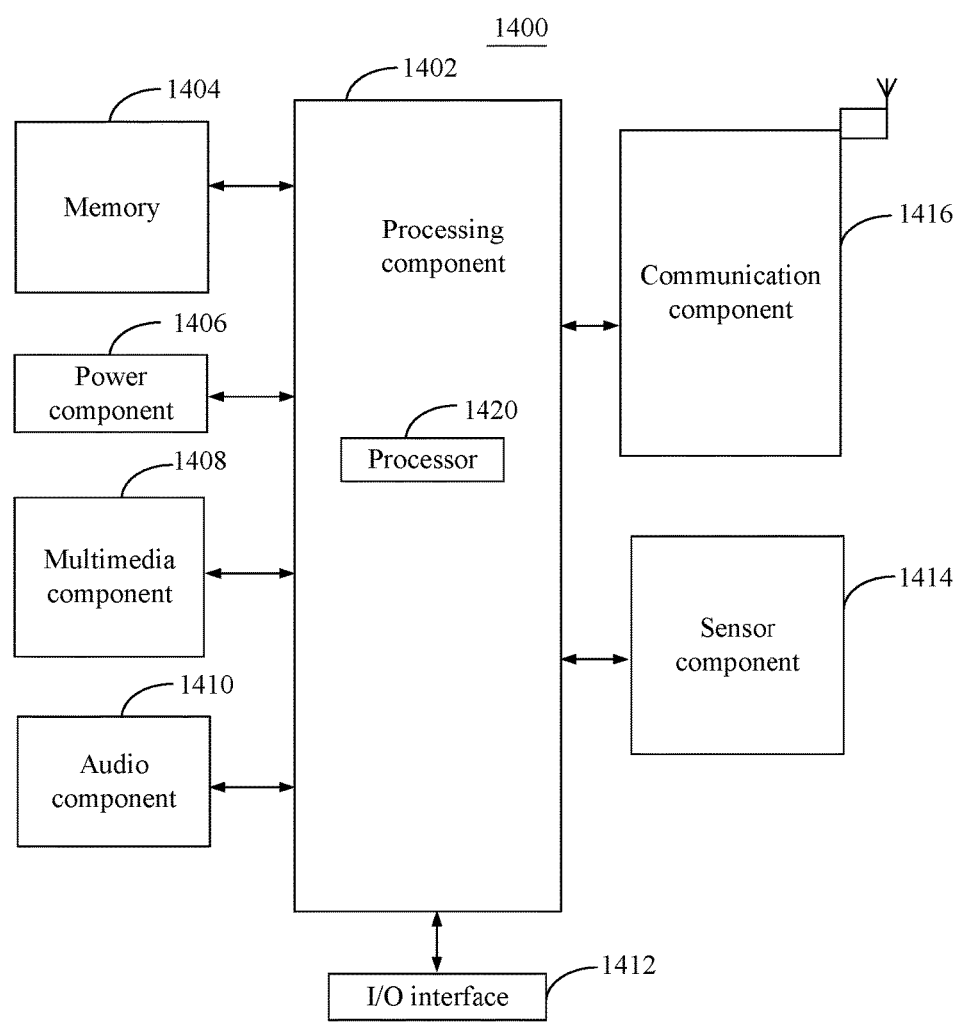
FIG. 14 is a block diagram of a device having an information display capability.

FIG. 14 is a block diagram of an information display device 1400 (a terminal side), according to an exemplary embodiment of the present disclosure. The device 1400 may be implemented as, for example, a mobile phone, a computer, a digital broadcast terminal, a messaging device, a gaming console, a tablet, a medical device, exercise equipment, a personal digital assistant and the like. Referring to FIG. 14, the device 1400 may include one or more of the following components: a processing component 1402, a memory 1404, a power component 1406, a multimedia component 1408, an audio component 1410, an Input/Output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the abovementioned methods. Moreover, the processing component 1402 may include one or more modules which facilitate interaction between the processing component 1402 and the other components. For instance, the processing component 1402 may include a multimedia module to facilitate interaction between the multimedia component 1408 and the processing component 1402.

The memory 1404 is configured to store various types of data to support the operation of the device 1400. Examples of such data include instructions for any applications or methods operated on the device 1400, contact data, phonebook data, messages, pictures, video, etc. The memory 1404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1406 provides power for various components of the device 1400. The power component 1406 may include a power management system, one or more power supplies, and other components associated with the generation, management and distribution of power for the device 1400.

The multimedia component 1408 includes a display screen providing an output interface between the device 1400 and the user. In some embodiments, the display screen may include a Liquid Crystal Display (LCD) panel and a Touch Panel (TP). If the display screen includes the TP, it may be implemented as an integrated touch/display screen to display information and receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 1408 includes a front camera and/or a rear camera. The front camera and/or the rear camera may receive external multimedia data when the device 1400 is in an operation mode, such as a photographing mode or a video mode. Each of the front camera and the rear camera may be a fixed optical lens system or have focusing and optical zooming capabilities.

The audio component 1410 is configured to output and/or input an audio signal. For example, the audio component 1410 may include a microphone (MIC), and the MIC is configured to receive an external audio signal when the device 1400 is in an operation mode, such as a call mode, a recording mode and a voice recognition mode. The received audio signal may be further stored in the memory 1404 or sent through the communication component 1416. In some embodiments, the audio component 1410 further includes a speaker configured to output the audio signal.

The I/O interface 1412 provides an interface between the processing component 1402 and a peripheral interface module. The peripheral interface module may be a keyboard, a click wheel, a button and the like. The button may include, but is not limited to a home button, a volume button, a starting button, and a locking button.

The sensor component 1414 includes one or more sensors configured to provide status assessment in various aspects for the device 1400. For instance, the sensor component 1414 may detect an on/off status of the device 1400 and relative positioning of components, such as a display and small keyboard of the device 1400. The sensor component 1414 may further detect a change in a position of the device 1400 or a component of the device 1400, presence or absence of contact between the user and the device 1400, orientation or acceleration/deceleration of the device 1400, and a change in temperature of the device 1400. The sensor component 1414 may include a proximity sensor configured to detect presence of an object nearby without any physical contact. The sensor component 1414 may also include a light sensor, such as a Complementary Metal Oxide Semiconductor (CMOS) or Charge Coupled Device (CCD) image sensor, configured for use in an imaging application. In some embodiments, the sensor component 1414 may also include an accelerometer, a gyroscope sensor, a magnetic sensor, a pressure sensor, a microwave sensor or a thermometer.

The communication component 1416 is configured to facilitate wired or wireless communication between the device 1400 and another device. The device 1400 may access a communication-standard-based wireless network, such as a Wireless Fidelity (WiFi) network, a 2nd-Generation (2G),3rd-Generation (3G), LTE, or 4th-Generation (4G) cellular network, or a combination thereof. In an exemplary embodiment, the communication component 1016 receives a broadcast signal or broadcast associated information from an external broadcast management system through a broadcast channel. In an exemplary embodiment, the communication component 1416 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and other technologies.

In the exemplary embodiment, the device 1400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned methods.

In the exemplary embodiment, there is also provided a non-transitory computer-readable storage medium storing instructions, such as the memory 1404 including an instruction. The instructions may be executed by the processor 1420 of the device 1400 to implement the above-described methods. For example, the non-transitory computer-readable storage medium may be a ROM, a Radom Access Memory (RAM), a Compact Disc Read-Only Memory (CD-ROM), a magnetic tape, a floppy disc, an optical data storage device and the like.

Each module or unit discussed above for FIG. 8-13, such as the recording module, the first jumping module, the first display sub-module, the acquisition sub-module, the first recording sub-module, the second display sub-module, the receiving sub-module, the second recording sub-module, the setting sub-module, the querying sub-module, the jumping sub-module, the first setting module, the first display sub-module, the receiving module, the second jumping module, the second setting module, the querying module, and the third jumping module, may take the form of a packaged functional hardware unit designed for use with other components, a portion of a program code (e.g., software or firmware) executable by the processor 1420 or the processing circuitry that usually performs a particular function of related functions, or a self-contained hardware or software component that interfaces with a larger system, for example.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for displaying electronic information, comprising:
    displaying a plurality of information segments of an information list one segment at a time according to a plurality of browsing operations performed by a user, wherein each browsing operation corresponds to one displayed information segment, wherein an information segment can begin at any location of the information list, and wherein each information segment fits a display screen;
    upon reception of a user operation performed by the user on a first information segment, that is being displayed, among the plurality of information segments,
    displaying a sub-interface of the first information segment,
    recording a dwell time for the sub-interface, wherein the dwell time is a measure of a length of time that the user stays on the sub-interface,
    determining whether the dwell time for the sub-interface exceeds a preset time threshold, and
    when it is determined that the dwell time for the sub-interface exceeds the preset time threshold, recording in chronological order of the user operation, identification information of the first information segment associated with the sub-interface, wherein the identification information comprises location information of the first information segment within the information list; and
    when a second information segment among the plurality of information segments is being displayed, upon reception of a jump instruction, jumping, from the second information segment, to the first information segment that has previously been displayed and of which identification information is recorded, according to the recorded identification information.

2. The method according to claim 1, wherein jumping to the first information segment according to the recorded identification information upon reception of the jump instruction comprises:
    providing a first jump tag configured for receiving user instruction to jump to the first information segment;

when the first jump tag is activated by the user, acquiring identification information corresponding to the first information segment from the recorded identification information; and jumping, from the second information segment that is being displayed, to the first information segment based on the acquired identification information corresponding to the first information segment.

3. The method according to claim 2 wherein there are at least two first information segments, and the method further comprises:

providing a second jump tag that is activatable;

in response to the second jump tag being activated, displaying at least two pieces of the recorded identification information, each being selectable and identifying a respective first information segment that has ever been displayed;

receiving a selection of one of the at least two pieces of the recorded identification information from the user; and jumping, from the second information segment that is being displayed, to the first information segment identified by the identification information selected by the user in response to the user selection of the user.

4. The method according to claim 1, wherein there are at least two first information segments, further comprising:

providing a third jump tag configured for receiving a user instruction to jump to an earliest one of the at least two first information segments; and when the third jump tag is activated by the user, acquiring identification information for the earliest first information segment from the recorded identification information, wherein jumping to the first information segment comprises jumping to the earliest first information segment.

5. An information display device, comprising:

a memory configured to store instructions therein;

one or more processor, when executing the instruction, configured to:

display a plurality of information segments of an information list one segment at a time according to browsing operations by a user, wherein each of the browsing operations corresponds to one displayed information segment, wherein an information segment can begin at any location of the information list, and wherein an information segment is a section of information within the information list that fits a display screen;

upon reception of a user operation performed by the user on a first information segments, that is being displayed, among the plurality of information segments, display a sub-interface of the first information segment, record a dwell time for the sub-interface, wherein the dwell time is a measure of a length of time that the user stays on the sub-interface, determine whether the dwell time for the sub-interface exceeds a preset time threshold, and when it is determined that the dwell time for the sub-interface exceeds the preset time threshold, record, in chronological order of the user operation, identification information of the first information segment associated with the sub-interface, wherein the identification information comprises location information of the first information segment within the information list; and when a second information segment among the plurality of information segments is being displayed, upon reception of a jump instruction, jump, from the second information segment, to the first information segment that has been previously been displayed and of which identification information is recorded and of which identification information is recorded, according to the recorded identification information.

6. The information display device according to claim 5, wherein to jump to the first information segment according to the recorded identification information upon reception of the jump instruction comprises:

provide a first jump tag configured for receiving user instruction to jump to the first information segment;

when the first jump tag is activated by the user, acquire identification information corresponding to the first information segment from the recorded identification information; and jump, from the second information segment that is being displayed, to the first information segment based on the acquired identification information corresponding to the first information segment.

7. The information display device according to claim 5, wherein there are at least two first information segments, and the one or more processor, when executing the instructions, are further configured to:

provide a second jump tag that is activatable;

in responsive to the second jump tag being activated, display at least two pieces of the recorded identification information, each being selectable and identifying a respective first information segment that has ever been displayed;

receive a selection of one of the at least two pieces of the recorded identification information from the user; and jump, from the second information segment that is being displayed, to the first information segment identified by the identification information selected by the user in response to the user selection of the user.

8. The information display device according to claim 5, wherein there are at least two first information segments, and the one or more processor, when executing the instructions, are further configured to:

provide a third jump tag configured for receiving a user instruction jump to an earliest one of the at least two first information segments; and when the third jump tag is activated by the user, acquire identification information for the earliest first information segment from the recorded identification information, wherein to jump to the first information segment comprises to jump to the earliest first information segment.

9. A non-transitory computer-readable storage medium having stored therein instructions that, when executed by a processor of a terminal, causes the terminal to:

display a plurality of information segments of an information list one segment at a time according to browsing operations by a user, wherein each of the browsing operations corresponds to one displayed information segment, wherein an information segment can begin at any location of the information list, and wherein an information segment is a section of information within the information list that fits a display screen;

upon reception of a user operation performed by the user on a first information segment, that is being displayed, among the plurality of information segments, display a sub-interface of the first information segment, record a dwell time for the sub-interface, wherein the dwell time is a measure of a length of time that the user stays on the sub-interface, determine whether the dwell time for the sub-interface exceeds a preset time threshold, and when it is determined that the dwell time for the sub-interface exceeds the preset time threshold, record, in chronological order of the user operation, identification information of the first information segment associated with the sub-interface, wherein the identification information comprises location information of the first information segment within the information list; and when a second information segment among the plurality of information segments is being displayed, upon reception of a jump instruction, jump, from the second information segment, to the first information segment that has previously been displayed and of which identification information is recorded, according to the recorded identification information.

* * * * *